(12) United States Patent
Pavlidis et al.

(10) Patent No.: US 6,829,370 B1
(45) Date of Patent: Dec. 7, 2004

(54) NEAR-IR HUMAN DETECTOR

(75) Inventors: Ioannis Pavlidis, Minneapolis, MN (US); Peter F. Symosek, Shoreview, MN (US); Bernard S. Fritz, Eagan, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/723,902

(22) Filed: Nov. 28, 2000

Related U.S. Application Data (63) Continuation of application No. 09/389,925, filed on Sep. 3, 1999, now Pat. No. 6,370,260.

(51) Int. Cl.[7] .................................................. G06K 9/00
(52) U.S. Cl. ....................................... 382/103; 348/169
(58) Field of Search ................................. 382/103, 100, 382/107, 115, 118, 218, 209, 210, 211, 212; 359/196; 348/584, 169; 250/339.1; 340/5.53, 5.83; 356/541, 51, 368, 448

(56) References Cited

U.S. PATENT DOCUMENTS

| | | | |
|---|---|---|---|
| 4,057,352 A | * 11/1977 | Babb | 356/407 |
| 4,500,784 A | * 2/1985 | Hacskaylo | 250/339 |
| 4,520,504 A | * 5/1985 | Walker et al. | 382/100 |
| 4,733,081 A | * 3/1988 | Mizukami | 250/341.8 |
| 5,013,917 A | 5/1991 | Ulich | |
| 5,180,907 A | 1/1993 | Udden et al. | |
| 5,221,919 A | 6/1993 | Hermans | |
| 5,293,427 A | * 3/1994 | Ueno et al. | 382/103 |
| 5,703,367 A | 12/1997 | Hashimoto et al. | |
| 5,792,050 A | 8/1998 | Alam et al. | |
| 5,801,763 A | 9/1998 | Suzuki | |
| 5,866,887 A | 2/1999 | Hashimoto et al. | |
| 5,900,942 A | 5/1999 | Spiering | |
| 5,940,139 A | * 8/1999 | Smoot | 348/584 |
| 6,002,505 A | * 12/1999 | Kraenert et al. | 359/196 |
| 6,178,259 B1 | 1/2001 | Harris | |
| 6,353,764 B1 | 3/2002 | Imagawa et al. | |
| 6,370,260 B1 | 4/2002 | Pavlidis et al. | |
| 6,498,564 B2 | 12/2002 | Oda | |

FOREIGN PATENT DOCUMENTS

| | | |
|---|---|---|
| EP | 0 990 416 A1 | 4/2000 |
| WO | 97/21188 | 6/1997 |
| WO | 01/95247 | 12/2001 |

OTHER PUBLICATIONS

Ballard, "Generalizing the Hough Transform to Detect Arbitrary Shapes," Pattern Recognition, vol. 13, No. 2, pp. 111–122, 1981.

Huang et al., "Face Detection and Precise Eyes Location," in Proceedings 15th International Conference on Pattern Recognition, 2000, vol. 4, pp. 722–727.

Jeon et al., "Rotation Invariant Face Detection Using a Model–Based Clustering Algorithm," in Proceedings 2000 IEEE International Conference on Multimedia and Expo, 2000, vol. 2, pp. 1149–1152.

(List continued on next page.)

Primary Examiner—Bhavesh M. Mehta
Assistant Examiner—Abolfazl Tabatabai
(74) Attorney, Agent, or Firm—Kris T. Fredrick (57) ABSTRACT

A detection method and system that detects reflection from a scene in at least a portion of an upper band of the near infrared spectrum (e.g., at least a portion within the range of 1.4 μm and above in the near infrared spectrum). The presence of a human body in the scene is then determined by comparing the reflection of at least one region of the scene (e.g., at least one region of the scene including a face region of the human body) to at least one other region of the scene (e.g., at least another region of the scene including one or more inanimate objects).

42 Claims, 7 Drawing Sheets

OTHER PUBLICATIONS

Kawato et al., "Two Step Approach for Real–Time Eye Tracking with a New Filtering Technique," in Proceedings 2000 IEEE International Conference on Systems, Man, and Cybernetics, 2000, vol. 2, pp. 1366–1371.

Kim et al., "Face Detection Using Multi–Modal Information" in Proceedings Fourth IEEE International Conference on Automatic Face and Gesture Recognition, 2000, pp. 14–19.

Li et al., "Multi–View Face Detection Using Support Vector Machines and Eigenspace Modeling," in Proceedings Fourth International Conference on Knowledge–Based Intelligent Engineering Systems & Allied Technologies, 2000, vol. 1, pp. 241–244.

Lv et al., "A Novel Algorithm for Rotated Human Face Detection" in Proceedings IEEE Conference on Computer Vision and Pattern Recognition, 2000, vol. 1, pp. 760–765.

Morimoto et al., "Real–Time Multiple Face Detection Using Active Illumination," in Proceedings Fourth IEEE International Conference on Automatic Face and Gesture Recognition, 2000. Pp. 8–13.

Pavlidis et al., "A Vehicle Occupant Counting System Based on Near–Infrared Phenomenology and Fuzzy Neural Classification,"IEEE Transactions on Intelligent Transportation Systems, vol. 1, No. 2, pp. 72–85, Jun. 2000.

Pavlidis et al., "The Imaging Issue in an Automatic Face/Disguise Detection System," in Proceedings IEEE Workshop on Computer Vision beyond the Visible Spectrum: Methods and Applications, 2000. Pp. 15–24.

Prokoski et al., "Identification of Individuals by Means of Facial Thermograph" Proceedings of the International Carnahan Conference on Security Technology: Crime Countermeasures. Atlanta, Oct. 14–16, 1992, NY, IEEE US, Oct. 14, 1992, pp. 120–125, XP000357473, p. 121, Right–Hand col., Line 4, p. 122, Left–Hand col., Last Paragraph: Table 2.

Rowley et al., "Neural Network–Based Face Detection," IEEE Transactions on Pattern Analysis and Machine Intelligence, vol. 20, No. 1 pp. 23–38, Jan. 1998.

Wilder et al., "Comparison of Visible and Infra–Red Imagery for Face Recognition," Proceedings Second IEEE International Conference on Automatic Face and Gesture Recognition, 1996, pp. 182–187.

Zhu et al., "Fast Face Detection Using Subspace Discriminant Wavelet Features," in Proceedings IEEE Conference on Computer Vision and Pattern Recognition, 2000, vol. 1, pp. 636–641.

Fendt et al., "The neuroanatomical and neurochemical basis of conditioned fear," Neurosci Biobehav Rev, 23(5):743–60 (May, 1999).

Jacquez et al., "The spectral reflectance of human skin in the region 0.7–2.6 $\mu$m," Technical Report 189, Army Medical Research Laboratory, Fort Knox (Apr., 1955).

Jordan et al., "Hierarchical Mixtures of Experts and the EM Algorithm," Neural Computation, 6, pp. 181–214 (1994).

Levin et al., "The energy expended in chewing gum," New England Journal of Medicine, 341(27):2100 (Dec., 1999).

Mendez, The Master of Disguise, William Morrow and Co., New York, N.Y.; cover page, title page, copyright page and table of contents only; 4 pp. (1999).

Moghaddam et al., "Probabilistic Visual Learning for Object Recognition," IEEE Trans. Pattern Analysis and Machine Intelligence, 19(7):696–710 (Jul., 1997).

Otsu, "A Threshold Selection Method from Gray–Level Histograms," IEEE Trans. Systems, Man And Cybernetics, 9:(1)62–65 (Jan., 1979).

Pavlidis et al., "Automatic passenger counting in the high occupancy vehicle (HOV) lanes" Proceedings 1999 Annual Meeting of the Intelligent Transportation Society of America, Washington, D.C. (Apr. 19–22, 1999).

Pavlidis et al., "A near–infrared fusion scheme for automatic detection of vehicle passengers," Proceedings 1999 IEEE Workshop on Computer Vision Beyond the Visible Spectrum: Methods and Applications, 41–48, Fort Collins, C.O. (Jun. 22, 1999).

Penev et al., "Local feature analysis: a general statistical theory for object representation," Network: Computation in Neural Systems, 7(3):477–500 (Aug., 1996).

Pentland et al., "Face recognition for smart environments," IEEE Computer, 33(2):50–55 (Feb., 2000).

Phillips et al., "The FERET database and evaluation procedure for face–recognition algorithms," Image and Vision Computing, 16(5):295–306 (Apr., 1998).

Prokoski "Disguise detection and identification using infrared imagery," Proceedings of SPIE, Optics, and Images in Law Enforcement II, 339:27–31, A.S. Hecht, ed., Arlington, V.A. (May, 1982).

Sabins, Remote Sensing, Principles and Interpretation, W.H. Freeman and Company, New York, N.Y.; cover page, title page, copyright page and table of contents only; 7 pp. (1997, 3rd ed.).

Sliney, "Laser and LED eye hazards: safety standards," Optics and Photonics News, pp 32– (Sept., 1997).

Visionics Corporation, "Face detection constantly searches for faces in a datastream" Jersey City, N.J.; retrieved from the Internet on Jun. 25, 2001, <URL:http://www.visionics.com/faceit/tech/detect.html>, 1 p.

Wiskott et al., "Face recognition by elastic bunch graph matching," IEEE Trans. Pattern Analysis and Machine Intelligence, 19(7):775–779 (Jul., 1997).

Zhu et al., "Region Competition: Unifying Snakes, Region Growing, and Bayes/MDL for Multiband Image Sementation," IEEE Transactions on Image Analysis and Machine Intelligence, 18(9): 884–900 (Sept., 1996).

* cited by examiner

NEAR-IR HUMAN DETECTOR

This Application is a continuation of Ser. No. 09/389,925, filed Sep. 3, 1999, now U.S. Pat. No. 6,370,260.

BACKGROUND

The invention pertains to detection of people, and particularly to detection of occupants in vehicles. More particularly, it pertains to image fusion in the near-infrared band under various kinds of environmental conditions.

The gathering of usage statistics in the high occupancy vehicle (HOV) lane is desired by some government agencies. These statistics are crucial for construction planning. Currently, the gathering of data is performed manually. This approach is obviously laborious, inefficient, and prone to error.

There are compelling reasons for the existence of an automatic occupant counting system in the HOV lane. It would facilitate the gathering of statistical data for road construction planning. It would enable state authorities to charge a nominal fee to single occupant vehicles in HOV lanes. It would also help the state patrols to perform their monitoring tasks more effectively.

The occupant counting system needs to be reliable. In a sensing system, reliability is rarely achieved if the signal is corrupted with noise. The first concern in the present effort is to produce a signal with as distinct a signature for the vehicle occupant as possible. This goal can be achieved only through careful design and arrangement of the sensing elements.

If one manages to acquire a clear imaging signal through sensors, then even moderately powerful pattern recognition algorithms could accomplish the occupant detection task. If, however, the imaging signal were noisy, then even the most powerful pattern recognition algorithms could not accomplish the task.

Related efforts by others have involved the use of a near-infrared camera (0.55 to 0.90 micron) and a near-infrared illumination source in the same range of wavelengths. One reason for using near-infrared sensing was the ability to use non-distracting illumination at night. Illumination at nighttime enhances the quality of the image. However, it appears that the choice of range of wavelengths is not appropriate because of its close proximity to the visible spectrum. Psychophysical experiments have shown that the human eye has some sensitivity to this range of near-infrared wavelengths, however small. This sensitivity may be sufficient to potentially cause accidents under certain conditions. Another reason for this approach, according to others, was to bypass the problems caused by solar illumination during daytime, such as glare. Nevertheless, particularly in that range (i.e., 0.55 to 0.9 micron) solar illumination is still substantial and the associated glare can be reduced only through the use of polarizing filters.

In more general terms, related art projects that involve imaging usually adopt the use of visible spectrum cameras. The strong point of the visible spectrum approach is that the relevant imaging sensors are very advanced and at the same time the cheapest across the electromagnetic (EM) spectrum. Visible spectrum cameras have a particular advantage in terms of speed, which is an important consideration in the HOV lane where vehicles are moving at rates of speed of 65 mph. These cameras can also have very high resolution, resulting in very clear images under certain conditions. Unfortunately, there are serious problems with the visible spectrum approach. For instance, some vehicles have heavily tinted window glass to reduce glare from solar illumination. This glass is nearly opaque to visible spectrum cameras. Also, visible spectrum cameras do not have operational capability during nighttime.

Many researchers adopt the visible spectrum as the spectrum of choice, or, in rare cases, some other EM spectrum based primarily on intuition. The result is that they usually end up with a non-discriminating signal that makes the detection problem appear more difficult than it actually is. Then, they try to address the difficulty by devising powerful pattern recognition algorithms but often to no avail. The loss of information because of a poor sensor choice, spectrum, and arrangement is usually irrevocable.

Visible spectrum or very near infrared detection of people in vehicles has not been very successful under most conditions. The glare and other problems caused by solar illumination, such as through vehicle windows, has prevented effective detection of vehicle occupants. Also, environmental conditions like weather obscure detection. People appear to have darker or lighter faces, depending on the characteristics of the people being detected, and on the incident angle and intensity of deliberate or incidental illumination. Other wavelengths of the EM spectrum do not appear to offer inexpensive, compact, and high resolution sensing and detection of human beings in vehicles.

The lower portion of the EM spectrum consists of the gamma rays, the x-rays, and radiation in the ultra-violet range. Radiation of such wavelengths is harmful. This radiation is typically used in a controlled manner in medical applications.

At the far end of the EM spectrum, there is the microwave and radio radiation. This range was recently started to be exploited for imaging purposes. Sensors operate in an active or in passive mode. The major advantage of these longer wavelengths is that they can penetrate clouds, fog, and rain for producing weather-independent imaging results. The technology for these wavelengths is new, and prohibitively expensive. Also the sensors are bulky in this range of radiation, and feature very low resolution. A useful application of these sensors is currently confined to the military and the remote-sensing domain.

SUMMARY OF THE INVENTION

The present invention utilizes radiation in the middle region of the EM spectrum regarded as the infrared spectrum. This spectrum includes wavelengths from 0.7 to 100 microns. Within the infrared range, two bands of particular interest are the 0.7 to 3.0 micron, 3.0 to 5.0 micron and 8.0 to 14 micron bands. The latter two bands are regarded as the thermal infrared band and the first band as the reflected infrared band. The reflected infrared band is associated with reflected solar radiation that contains no information about the thermal properties of materials. This radiation is for the most part invisible to the human eye. The thermal infrared band, on the other hand, is associated with the thermal properties of materials.

The thermal infrared band is significant for several reasons. First, the human body maintains a relatively constant temperature of about 37 degrees Celsius (C), irrespective of physical characteristics or illumination conditions. This indicates a consistent light color pattern for the faces of vehicle occupants subject to thermal infrared imaging. This consistency is lacking in the visible spectrum. Such consistency facilitates interpreting sensed images. Further, the thermal property serves as a differentiator between humans and dummies. Also, a sensor functioning in the thermal region is operational day and night without any need for an external illumination source.

However, one concern is the attenuation of thermal infrared radiation caused by glass, when detecting humans in a vehicle. The glass severely disrupts the transmission of infrared radiation at wavelengths greater than 2.8 microns. At 2.8 microns, thermal energy just begins to appear. To obtain an infrared image under such conditions, one needs a very sensitive mid-infrared camera in the range from 2.0 to 3.0 microns. Vehicle windows are not made from common glass for reasons of safety, energy efficiency, and visibility. Also, the composition of the front windshield differs significantly from the composition of the side windows of a vehicle. The side windows are more transparent to the transmission of thermal infrared radiation. However, detection with a near-infrared camera significantly reduces this problem of radiation attenuation.

A near-infrared camera, if it is restricted to the appropriate range, outputs similar imaging signals for various humans despite their having different colors of skin. However, this camera outputs a much different imaging signal for a dummy having the same visible color as the human skin.

One embodiment of the present invention has two cameras of different sensing wavelengths in the near-infrared bandwidth. These cameras are pointed toward a place where humans may be detected. A near-infrared lamp for the illumination of the scene may be used. The two outputs of the cameras are fused together with a weighted difference to result in an image having an intensified contrast. The image output of the device that performs the fusion of the two camera images goes to a post-processor, which performs binary thresholding on the various pixels of the fused image. The result is an image with each pixel either being black or white. The thresholded output undergoes such operations as fuzzy neural network or analytical processing. The thresholded output diminishes all of the background of the viewed scene, except human skin such as faces. This approach is one embodiment of the human detector.

Another embodiment according to the present invention provides a detection method that includes detecting reflection from a scene in at least a portion of an upper band of the near infrared spectrum (e.g., at least a portion within the range of 1.4 $\mu$m and above in the near infrared spectrum). The presence of a human body in the scene is then determined by comparing the reflection of at least one region of the scene (e.g., at least one region of the scene including a face region of the human body) to at least one other region of the scene (e.g., at least another region of the scene including one or more inanimate objects).

A human body detection system embodiment according to the present invention includes a camera sensitive to at least a portion of an upper band of the near infrared spectrum (e.g., at least a portion within the range of 1.4 $\mu$m and above in the near infrared spectrum) to provide pixel value signals based on detected reflectance of a scene. Circuitry operable (e.g., hardware or processor executing software) to provide a comparison of the detected reflection of at least one region of the scene (e.g., at least one region of the scene including a face region of the human body) to the detected reflection of at least another region of the scene (e.g., at least another region of the scene including one or more inanimate objects) is used in detecting the presence of a human body in the scene.

DESCRIPTION OF THE EMBODIMENT

Figure 1:
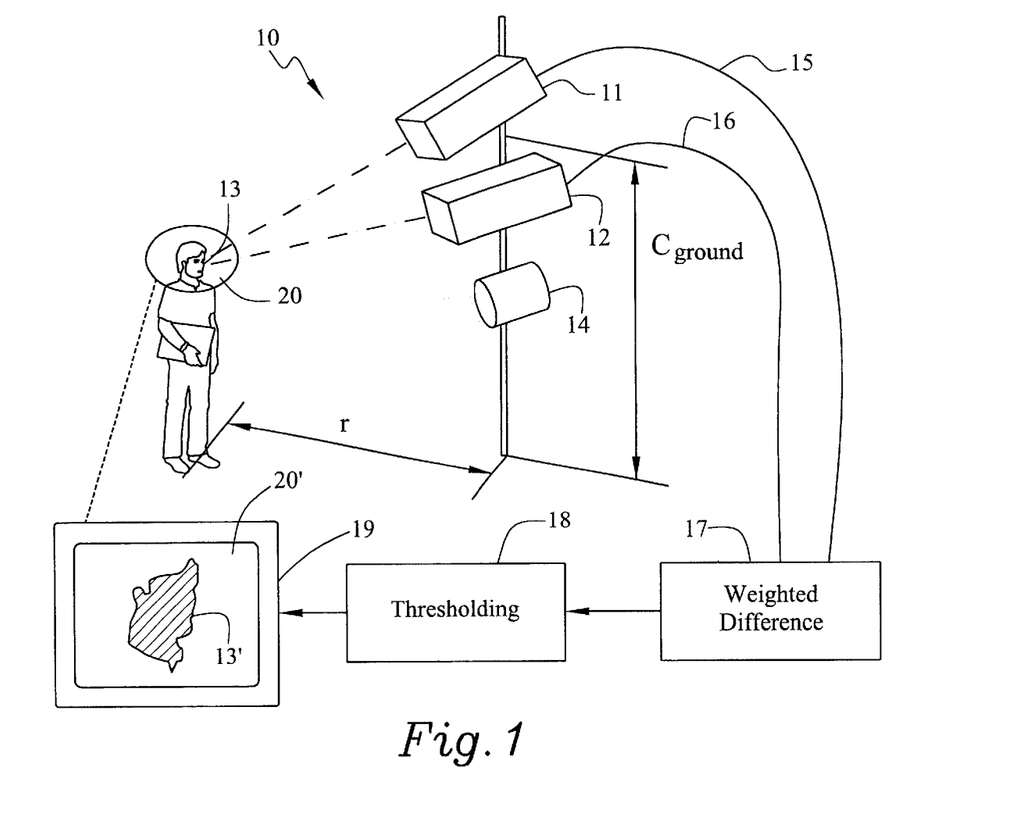
FIG. 1 shows a near-infrared fusion system for detecting humans.

FIG. 1 shows a basic layout of a near-infrared fusion system 10 for detecting humans. It is a dual-band imaging system. Two co-registered cameras 11 and 12 sense the image of, for instance, a face 13 of a human being. Camera 11 has a spectral sensitivity of 0.8 to 1.4 microns. Camera 12 has a spectral sensitivity of 1.4 to 2.2 microns. Slightly shorter or longer ranges can also yield acceptable detection results. The 1.4-micron threshold point between the two bands of spectral sensitivity is a preferable demarcation point for the dual-band system 10, but may be another value as appropriate. Each of the camera sensitivity band ranges can cross somewhat the 1.4 micron wavelength without diminishing the human detecting ability of system 10. The quality of the imaging signals from cameras 11 and 12 remain high even during overcast days and at nighttime, because the scene being scanned by cameras 11 and 12, can be illuminated with an eye-safe near-infrared illuminator 14. Since the eye is not sensitive to the near-infrared spectrum, system 10 can remain stealthy all of the time, whether in a detection mode or not. Ideally, the camera at the lower band range (0.8 to 1.4 microns) should be an image intensifier. Therefore, the illuminator's spectral emission specification needs to match only with the upper band range (1.4 to 2.2 microns). The upper band range is quite far from the visible spectrum and illumination in these wavelengths is safe even for highway applications. Near-infrared cameras 11 and 12 provide clear imaging signals even in foul weather conditions such as hazy conditions. These particular infrared bands of detection and illumination provide for sufficient light transmission through windshields, side windows, fog, and darkness. This permits adequate detection of humans in vehicles at night and in poor weather.

The image outputs 15 and 16 of cameras 11 and 12, respectively, go to a weighted difference software process 17 or specialized hardware that fuses the outputs by performing weighted subtraction of the intensities of the two camera images. This weighted difference software or hardware may be referred to as a fuser. Such fusion of the camera outputs intensifies the silhouette of face 13 and other exposed human skin in the resultant fused image. Also, the image features a diminution of the background of the scene being covered by the cameras. This increased contrast between the person and the background in the fused image permits essentially perfect image segmentation through thresholding by a software process 18, or specialized hardware. This thresholding software or hardware may be referred to as a thresholder. The output of the thresholder 18 may go to a display 19, printers or a post-process or specialized hardware.

A final processed image shows the exposed skin parts, such as face 13, as binary blob 13', as shown in FIG. 1. Background 20 of sensed face 13 is discounted as shown by blank background 20' in display 19. This clean-cut binary imagery ensures reliable and fast operation of a pattern recognition algorithm that identifies a human as indicated by face 13' imagery.

Figure 2:
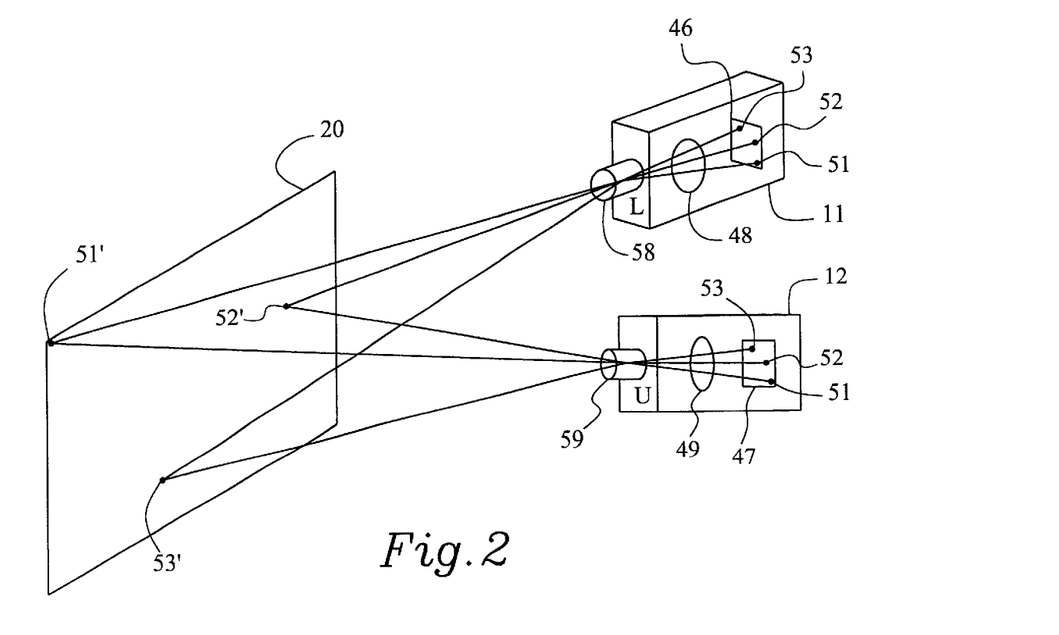
FIG. 2 illustrates a co-registration scheme for two cameras.

FIG. 2 illustrates the co-registration of cameras 11 and 12. There is spacial and time registration between the cameras. The cameras could be of the same make and model. The necessary difference between the cameras is the optical bandwidth filters, 48 and 49, which are situated between sensing arrays 46 and 47 and camera lens 58 and 59, respectively, of cameras 11 and 12. Filter 48 determines the 0.8 to 1.4 micron spectral sensitivity of array 46 in camera 11 and filter 49 determines the 1.4 to 2.2 micron spectral sensitivity of array 47 in camera 12. A polarizer may be inserted in front of lens 58 of camera 11 and in front of lens 59 of camera 12. Or instead, a polarizer may be inserted between lens 58 and array 46 of camera 11, and between lens 59 and array 47 of camera 12. Sensing arrays 46 and 47 of the cameras are the same size, for example, 512 by 512 pixels in a gallium arsenide substrate. Typically, the fields of view are the same for each array. Three pixels 51, 52, and 53, for example, are selected out for spacial co-registration. Each of the three pixels are focused on corresponding portions 51', 52', and 53', respectively, of image 20 viewed by cameras 11 and 12. That means the arrays have the same images, pixel for pixel, even though the spectral sensitivities are different. In other words, the columns and rows of pixels are aligned with the physical world scene, pixel for pixel. Once spacially co-registered, cameras 11 and 12 are kept stationary relative to the physical world.

Time co-registration of the cameras means that the cameras are in synchronization with each other from a signal perspective. The signals for each of the two corresponding pixels go to a frame buffer at the same time. The retention of light for each pixel is in the micro-second range. A typical frame time is about 33 milliseconds, which is 30 frames per second. The transfer of pixel data may be parallel, line-by-line, or serial, pixel-by-pixel, or any other style of information transfer. There is a sync signal for cameras 11 and 12 to initiate and maintain their time co-registration.

The image-outputs or pixel signals 15 and 16 go to a software process or specialized hardware 17 which provides a certain weighting to each of the pixels and fuses pairs of corresponding pixels from cameras 11 and 12, respectively, into single pixels. The weighted differencing is performed pixel by pixel. Each result is the fused pixel of the two weighted differenced pixels. The weight difference equation for such fusing is $$P(i,j)_{fused} = P(i,j)_{lower\ band} - C*P(i,j)_{upper\ band}.$$

P is spectral power. The position or location of each pixel in the respective image is identified by row (i.e., "i") and column (i.e., "j"). The rows and columns of pixels of the images of cameras 11 and 12 coincide with each other. The lower band pixels are these from camera 11 and the upper band pixels are those from camera 12. The spectral power "P" for each pixel at i,j is indicated by a numeral scale of brightness from 0 to 255. "0" is entirely black or dark (i.e., no spectral power) and "255" is entirely white or bright (i.e., full spectral power). Numerical indications in between 0 and 255 are, of course, representative of various gradations of gray, brightness, or spectral power. "C" of the equation is a constant (i.e., weighting factor), which is determined according to the lighting of background or scene 20 and object or face 13. "C" for daytime lighting conditions is about 3 for optimal results. "C" for nighttime depends upon the spectral distribution and properties of an artificial illuminator 14.

The brightness or spectral power of a typical pixel of the lower band (image 46) may be 55 and the brightness or spectral power of the corresponding typical pixel of the upper band (image 47) may be 10. These upper and lower band pixel values are representative of skin in the corresponding bands. The spectral power of a resulting typical fused pixel, in daytime viewing, at a location of row i and column j in the daytime is determined with the following calculation.

$$P(i,j)_{fused} = 55 - 3*10$$

$$P(i,j)_{fused} = 55 - 30 = 25$$

The fused pixel signals go from software process or specialized hardware 17 to software process or specialized hardware 18 for image segmentation via thresholding of the fused pixels. Process or specialized hardware 18 emulates a comparator-like circuit in that each fused pixel below a certain threshold value (T) is assigned a value ($V_1$) of 0 and each fused pixel above the certain threshold value is assigned a value ($V_2$) of 255.

Figure 3:
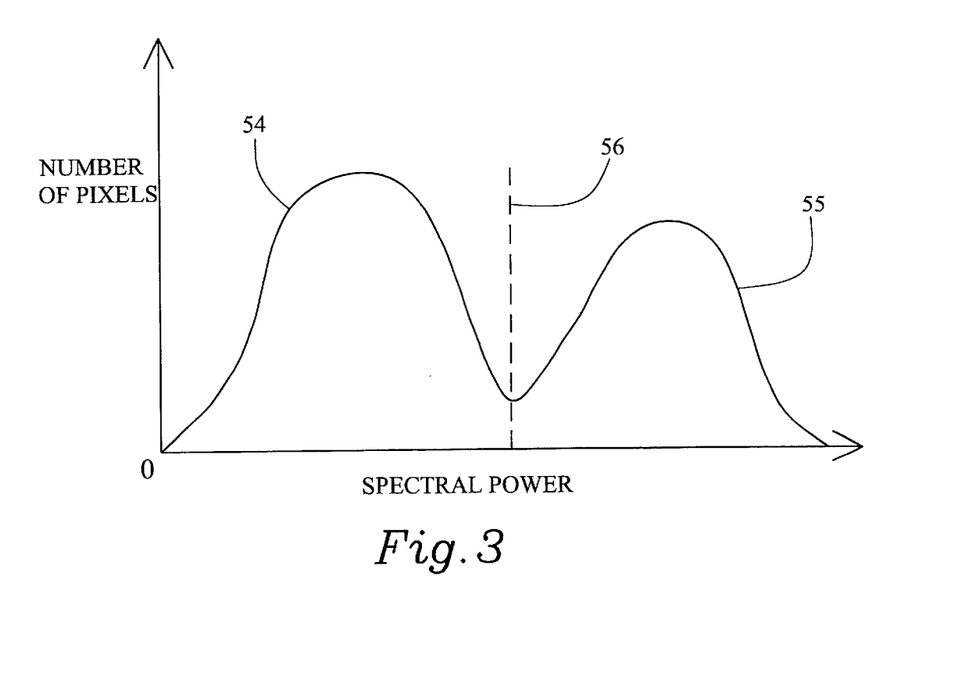
FIG. 3 is a histogram of the number of pixels versus spectral power for an image frame.

FIG. 3 shows a histogram of an image frame of fused pixels. The number of pixels for each spectral power value is indicated by curves 54 and 55 for a given sensed image. The pixels of curve 54 represent background 20 and the pixels of curve 55 represent human skin 13. Curves 54 and 55 intersect at 56 that is deemed to be the appropriate value for thresholding. If curves 54 and 55 do not intersect, then the thresholding value 56 is centered between curves 54 and 55. The threshold value is dynamic in that it changes from frame to frame, and is determined for each image frame according to the histogram of the respective frame. If the spectral value for thresholding is 20, then fused pixels having a value below 20 are valued at 0 and fusedpixels having a value above 20 are valued at 255. The resulting image in display 19 has white pixels for background 20' and black pixels for face 13'. This image may be reversed by process or specialized hardware 18 such that background 20' has black pixels and face 13' has white pixels.

As one can note here, a main application of the invention is people detection in vehicles. However, people detection can be used at security points, alert areas, and so forth. An enhanced version of system 10 may be used to actually identify people.

Figure 4:
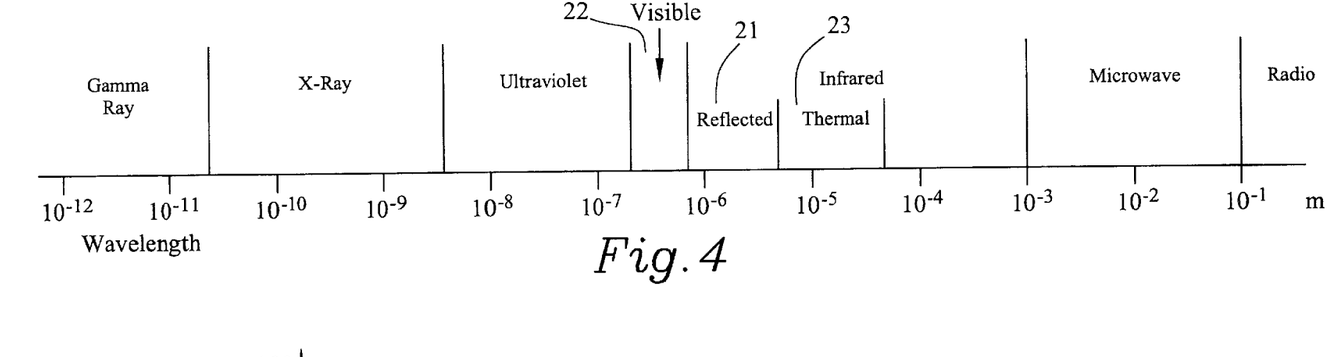
FIG. 4 is the graph of the EM spectrum.

The spectrums that cameras 11 and 12 function are within the reflected infrared portion 21 in FIG. 4, which shows the EM spectrum. Visible spectrum 22 is the spectral sensitivity of conventional cameras. Unfortunately, visible light cameras have noise levels that increase during poor environmental conditions such as bad weather, nighttime, and direct sunlight. Some problems, such as nighttime viewing may be overcome with artificial lighting, which matches the visible spectrum of the camera, and which in vehicle occupant detection is a serious distraction to drivers. Another disadvantage is that a human face 13, which is the object of interest, does not have consistent qualities within the visible range. Vehicle occupant faces appear dark or light, depending on the physiological characteristics of the occupant, and the intensity and incident angle of illumination.

The thermal infrared band 23 (3.0 to 5.0 and 8.0 to 14 microns) is associated with thermal properties of materials. The human body is at a temperature of 37 degrees C. This means that human faces have a consistent light color in thermal infrared imaging, despite various facial colors, which is contrary to visible imaging.

The thermal property of the body provides a clear differentiator from look-alike dummies. The thermal infrared sensor can function at night without an external illuminator. One disadvantage of using the thermal infrared band 23 for occupant detection is that vehicle windshield glass greatly attenuates infrared light transmission at 2.8 microns and higher.

Figure 5:
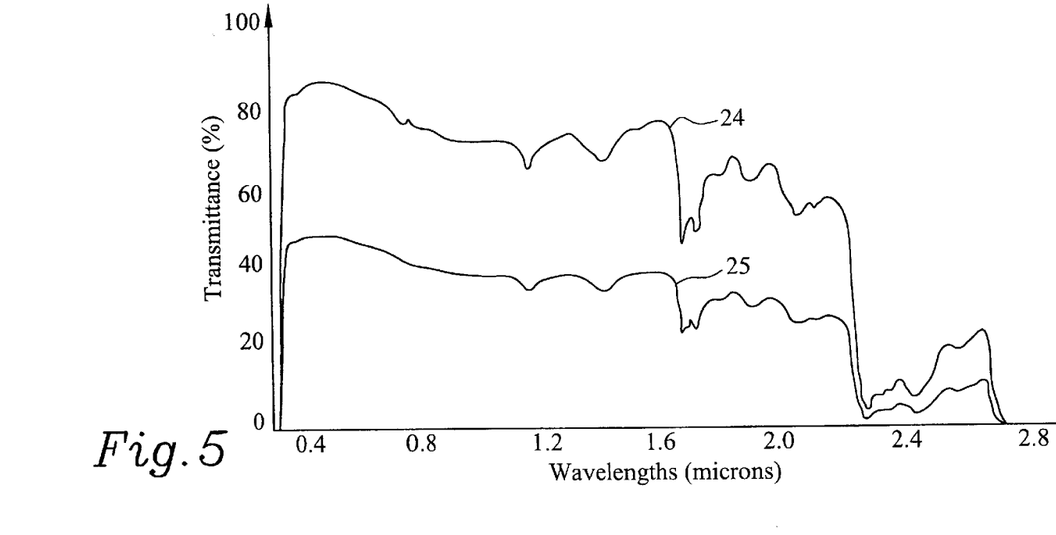
FIG. 5 reveals the infrared transmittance characteristics for an automobile windshield.
Figure 6:
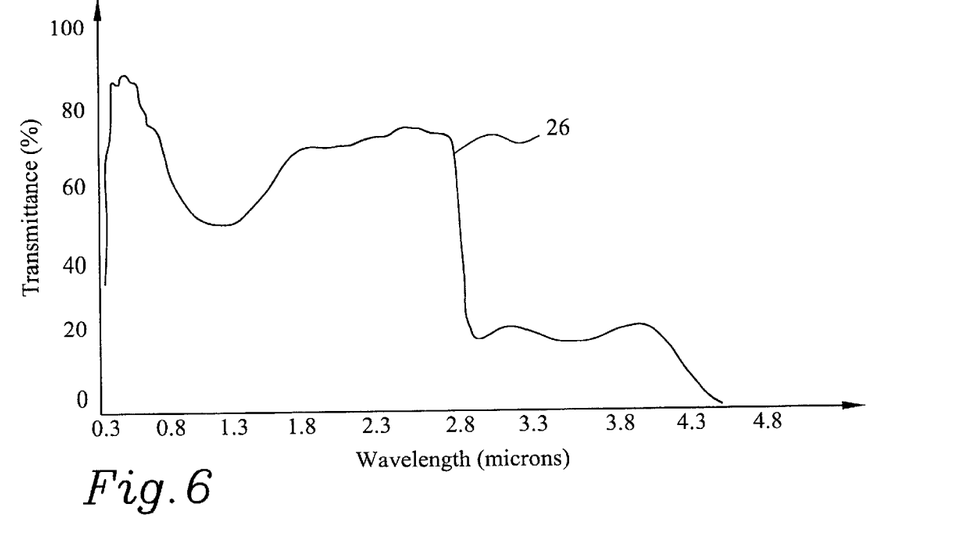
FIG. 6 reveals the infrared transmittance characteristics for an automobile side window.

FIG. 5 reveals the transmittance characteristics of infrared light between 0.4 and 2.8 microns for a clean vehicle windshield (curve 24) and a dirty windshield (curve 25). Beyond 2.8 microns of thermal infrared bandwidth 23, the radiation transmittance characteristic of windshield glass is almost zero. The transmittance of a lightly tinted side window of a vehicle is good (50 to 85%), from 0.3 up to 2.8 microns as revealed by curve 26 in FIG. 6. Between 2.8 and 4.3 microns, the radiation transmittance is about 20 percent for the side vehicle window. Beyond 4.3 microns the transmittance drops to nearly zero. However, the spectral behavior of the side window permits transmittance of some thermal radiation.

Figure 7:
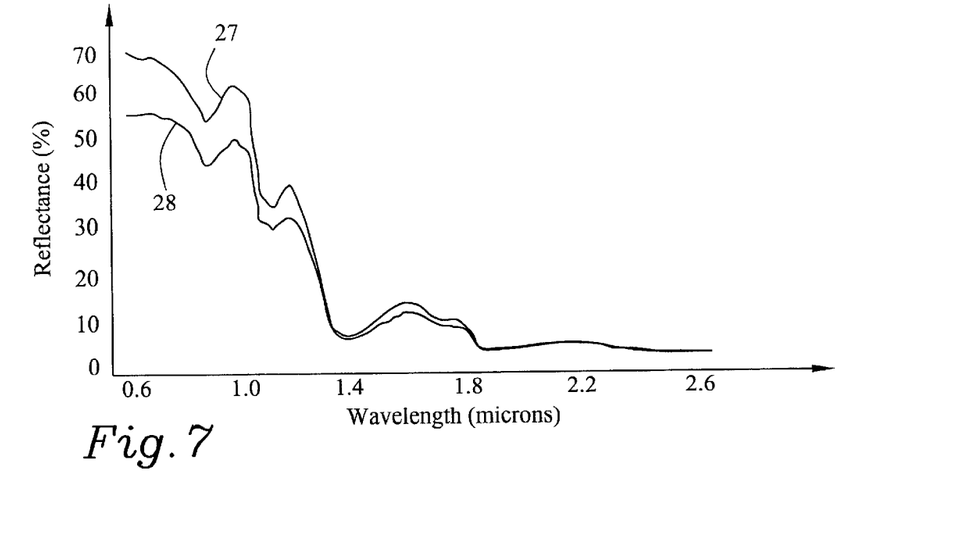
FIG. 7 is a graph showing the percentage of reflectance for Caucasian males of light and dark complexions.

Curves 27 and 28 of FIG. 7 show the percentage of reflectance of infrared light for light and dark complexion Caucasian males, respectively. The reflectance is good between 0.6 and 1.4 microns. Above 1.4 microns, the reflectance is significantly diminished. However, the difference of reflectances of light and dark complexions are minimal.

Figure 8:
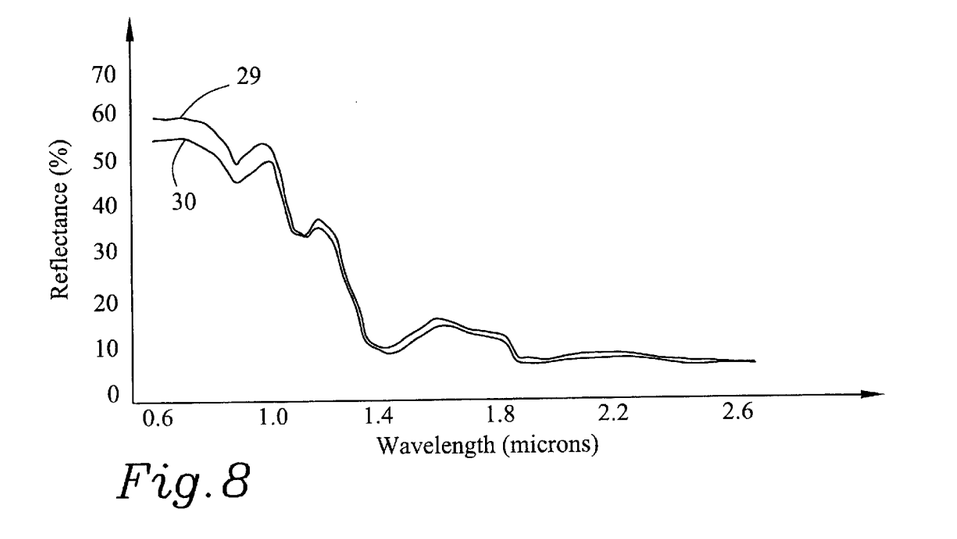
FIG. 8 is a graph showing the percentage of reflectance for Asian males of light and dark complexions.
Figure 9:
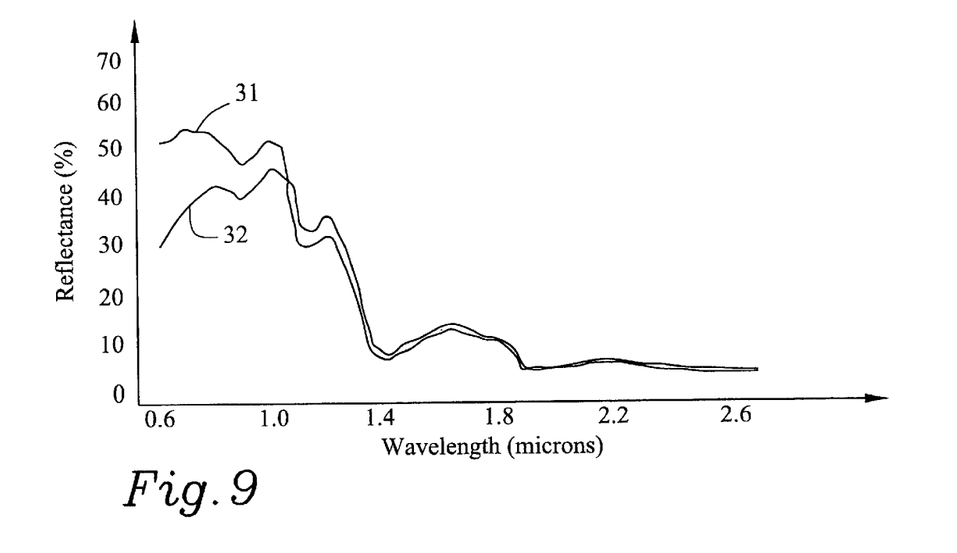
FIG. 9 is a graph showing the percentage of reflectance for black males of light and dark complexions.

In FIG. 8, curves 29 and 30 show skin reflectances for light and dark complexions, respectively, of Asian males. Curves 31 and 32 of FIG. 9 show skin reflectances for light and dark complexions of black males. Even though the reflectances of light complexions are higher than those of dark complexions; curves 27, 28, 29, 30, 31 and 32 of FIGS. 7–9, respectively, have similar shapes and all of them drop off at about 1.4 microns. These reflectances show some variation for all complexions of the Caucasian, Asian, and black males, between 0.6 and 1.4 microns.

Figure 10:
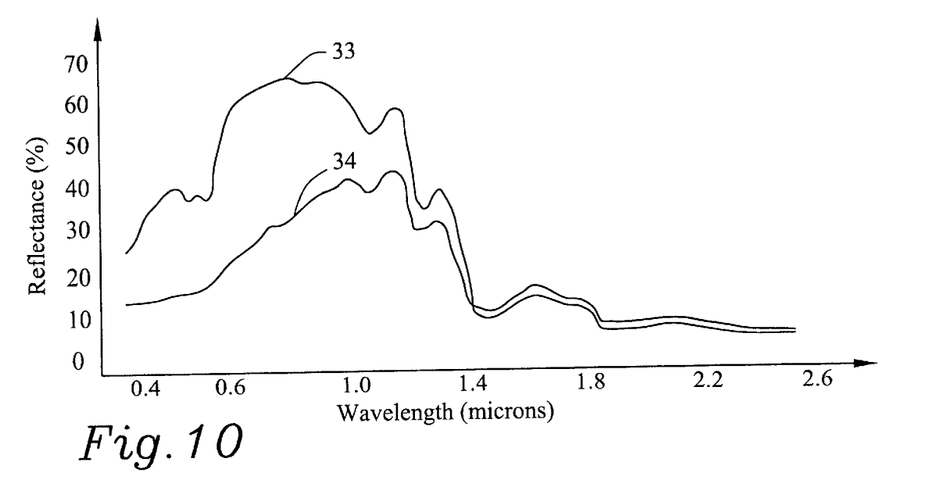
FIG. 10 is a graph showing a comparison of reflectances for light and dark skin.

Curves 33 and 34 of FIG. 10 show the reflectances for more extreme differences of light skin and dark skin, respectively. The reflectances of light and dark skin are significant up to 1.4 microns. After 1.4 microns, reflectance curves 33 and 34 for light and dark skin, respectively, become almost coincident and the resultant reflectances drop below 20 percent. Thus, in the near-infrared bands of 1.4 and above, the reflectance of detected humans of all kinds of skin shade, are about the same at wavelengths greater than 1.4 microns.

Figure 11:
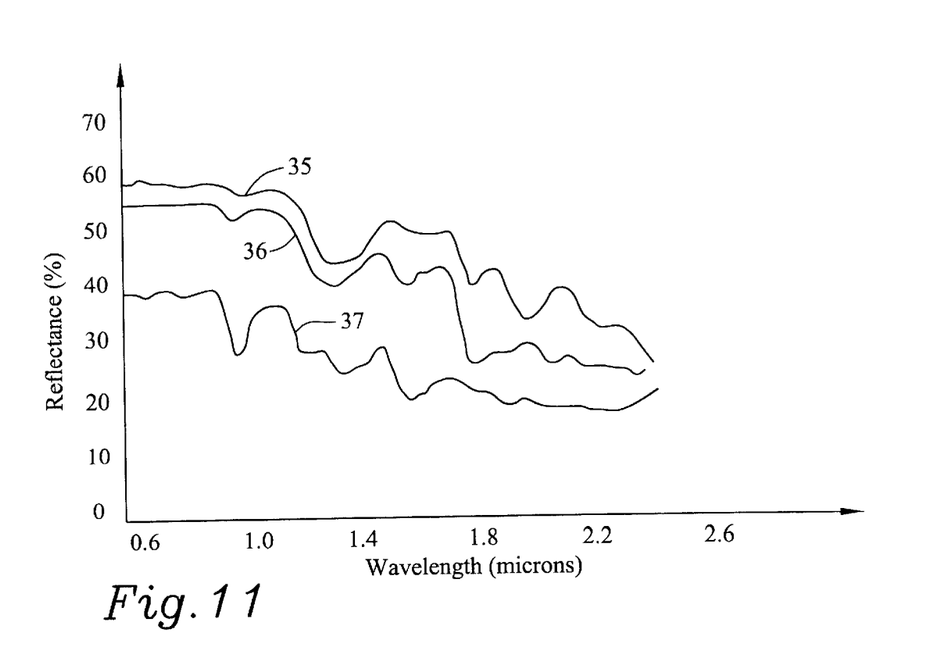
FIG. 11 is a graph of reflectances for cotton, wood and polyamide.

In FIG. 11, curves 35, 36, and 37 show the reflectance for cotton, wood, and polyamide respectively, to be significant not just between 0.6 and 1.4 microns, but beyond 1.4 microns. The insignificant drop in reflectance after the 1.4 micron threshold point, is a basis that shows a large contrast in reflectance between the human face and inanimate objects, such as upholstery, the dashboard, and fabrics in a vehicle, which are background, and provide for easy detection of the human face in the range of 1.4 to 2.2 microns.

Consequently, there is a significant contrast, in reflectance between the images of a Caucasian male and a dummy head from a camera operating in the range between 1.4 and 2.2 microns. The image of the dummy is reflective and appears rather bright and the male human image is dark and thus the resultant contrast between the two images is rather stark. This person detection scheme is much superior to visible light imaging, since the latter scheme reveals little or no contrast between the Caucasian and dummy heads of like colors. In summary, it is easy to distinguish images of the human head from those of the dummy head in the 1.4 to 2.2 micron range imagery, but not easy to distinguish the images of the respective heads from each other in the 0.8 to 1.4 micron range imagery.

Figure 12:
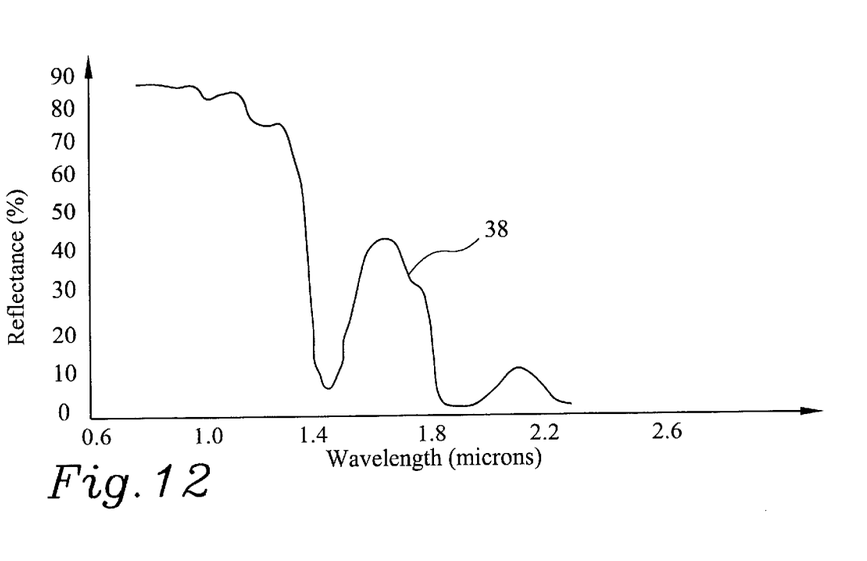
FIG. 12 is a graph of reflectance for distilled water.

The lower reflectivity of human skin for the 1.4 to 2.2 micron spectral range is explained by the spectral reflectance of distilled water as shown by curve 38 of FIG. 12. There is a substantial drop in reflectance at about 1.4 microns. Beyond 1.4 microns, the water absorbs substantial infrared radiation and appears in an image as a dark body. Since the composition of the human body consists of 70 percent water naturally, its spectral response is similar to that of water. So camera 12, operating in the 1.4 to 2.2 micron range, captures this unique human body differentiator. With the operating range of camera 12, one can safely use during nighttime a matching near-infrared illumination source 14 to improve the quality of the sensed image of face 13. This light is invisible to humans, such as vehicle drivers, but also is harmless to their eyes since the wavelength of illuminator 14 is above the safe threshold of 1.4 microns.

Also, since cameras 11 and 12 of system 10 operate at a lower band than the mid-infrared band, glass penetration is not a problem and cameras 11 and 12 can easily detect through the frontal windshield of a vehicle. Thus, speed requirements for cameras 11 and 12 are less restrictive. In an actual highway site, a zoom lens would be used.

Figure 13:
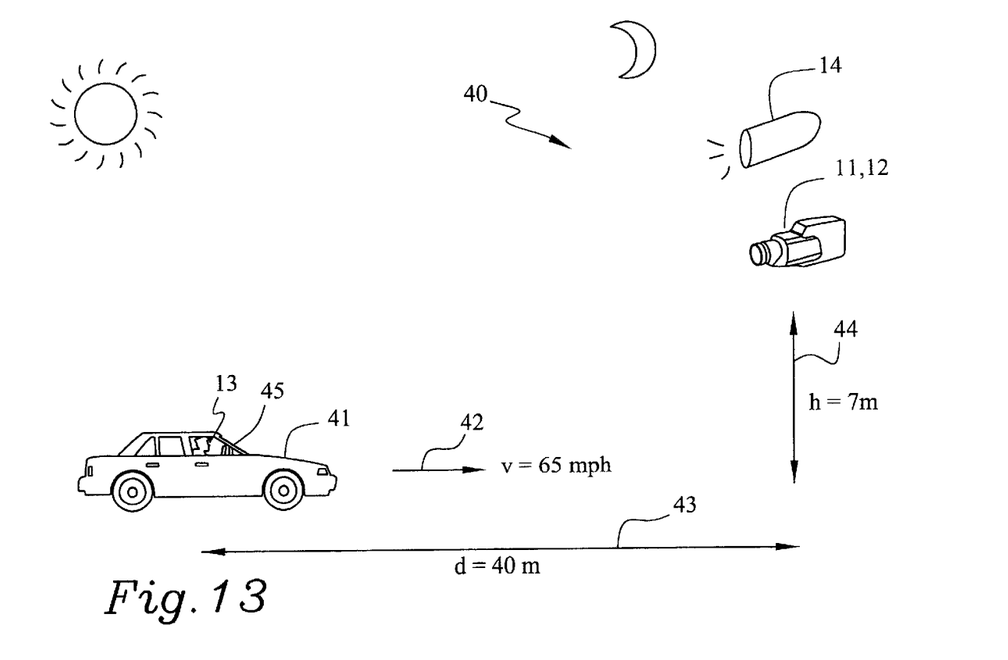
FIG. 13 shows a layout for determining the speed characteristics of a human detection system.

FIG. 13 shows a layout of a near-infrared system 40 for determining the speed characteristics of the human detector. A vehicle 41 may be assumed to be moving down a highway at a velocity v, as shown by vector 42, and be observed in a frontal view with a near-infrared camera 11 or 12 at a distance d, as shown by line 43, and from a height h, as shown by line 44. Only one of the cameras 11 and 12 is needed for this evaluation, but it may be either one of them. Camera 11, 12 may be a Sensors Unlimited Inc. SU 320 equipped with a telephoto lens, a band-pass filter in the range 1.4 to x microns (where x>1.4 microns), and a polarizing filter to reduce the glare effect from the sun illumination during daytime.

During the daytime, system 40 uses the illumination of the sun. The objective is to determine if there is any appropriate geometric arrangement for camera 11, 12 so that the signal to noise (S/N) ratio and the camera speed are kept at acceptable levels even under adverse conditions. An acceptable (S/N) ratio is considered anything above 35. The speed quality is considered acceptable when the image smearing does not exceed the width of one pixel.

The first step in a radiometric computation is to determine the amount of radiation that falls upon the objects of interest such as the occupants of vehicle 41. The spectral band considered is above the 1.4-micron threshold point. Because of constraints due to the quantum efficiency of the camera SU-320 that was used in the actual experiments, one limits the spectral band in the range of 1.4 to 1.7 microns. Slightly modified things are in effect for the extended range of 1.4 to 2.2 microns. The spectral irradiance of the sun (the illumination source) on a clear day at sea level is approximately $I_{sunny}=0.008$ Watts/cm$^2$ in the 1.4 to 1.7 micron band range. In this computation, however, one considers the worst case scenario of an overcast day. For an overcast day, the irradiance value is reduced by $10^{-3}$ thus giving irradiance at vehicle 41 of approximately $$I_{overcast} = 10^{-3} * I_{sunny}$$
$$= 10^{-3} * 0.008$$
$$= 8 \; \mu Watts/cm^2.$$

The transmittance in this spectral range of windshield 45 of vehicle 41 is approximately 0.4 resulting in an irradiance on the vehicle occupants of $$I_{occupant} = 0.4 * I_{overcast}$$
$$= 0.4 * 8$$
$$= 3.2 \; \mu Watts/cm^2.$$

The second step in a radiometric computation is to determine how much of the incident radiation on the objects of interest is reflected back to the sensor (i.e., near-infrared camera 11, 12). The radiance into a hemisphere assuming a reradiate of 0.4 would be $$R_{occupant} = 0.4 * I_{occupant} / \pi$$
$$= 0.4 * 3.2 / \pi$$
$$= 0.4 \; \mu Watts/cm^2 - steradian.$$

This represents the reflected portion of the occupant irradiation. The occupant's body absorbs the rest. The reflected radiation has to pass through windshield 45 and the camera 11, 12 lens to reach the near-infrared sensor array of camera 11, 12. One assumes a 0.4 windshield transmittance, a f/2 camera lens (i.e., having a 14.32° cone angle) with 0.8 transmittance, a polarizer with 0.4 transmittance, and a band-pass filter with 0.6 transmittance. Then, the irradiance at the sensor array of camera 11, 12 will be $$I_{camera} = 0.4 * 0.8 * 0.4 * 0.6 * \pi * R_{occupant} * \sin^2(14.32°)$$
$$= 0.4 * 0.8 * 0.4 * 0.6 * \pi * 0.4 * \sin^2(14.32°)$$
$$= 0.006 \; \mu Watts/cm^2.$$

Camera 11, 12 has square pixels with a side of $37.5*10^{-4}$ cm or an area $$A = 37.5 * 10^{-4} * 37.5 * 10^{-4}$$
$$= 1.40 * 10^{-5} \; cm^2.$$

Consequently, the radiant power on the camera 11, 12 pixel will be $$P_{pixel} = A * I_{camera}$$
$$= 1.4 * 10^{-5} * 0.006$$
$$= 0.084 * 10^{-12} \; Watts.$$

The camera's detectivity $D^*$ is $D^*=10^{12}$ cm $\sqrt{Hz}$/Watts. The noise equivalent power (NEP) is related to detectivity $D^*$, pixel area A, and electronic bandwidth $\Delta f$ by the following equation:

$$NEP = (A/\Delta f)^{1/2}/D^*.$$

The bandwidth $\Delta f$ is determined by the exposure time of camera 11, 12. The exposure time depends on vehicle 41 velocity 42, camera range 40, and the camera 11, 12 field of view such that the images smear less than 1 pixel. Assuming vehicle 41 traveling at a speed of 65 mph, at a distance d 43 of 40 meters (m) away from camera 11, 12, and with a field of view of 1.6 m, the 320×240 pixel array of camera 11, 12 gives a maximum exposure time of 1 ms or a bandwidth of $\Delta f=1$ kHz. Substituting the values for A, $\Delta f$, and $D^*$ in the formula of NEP, one gets $$NEP = 1.18 * 10^{-13} \; Watts.$$

Therefore, the signal to noise ratio S/N will be $$S/N = (P_{pixel}/NEP) = 0.7.$$

In conclusion, assuming a worst case scenario (overcast day, dirty windshield, dark occupant skin) one determines that camera 11, 12, equipped with a f/2 lens, a 1.4 to 1.7 $\mu$m filter, and a polarizer, if it is positioned at a distance 43 of d=40 m from incoming car 41 and at a height 44 of h=7 m at the specified distance 43, will achieve an acceptable smear of less than one pixel because the required exposure time of 1 ms is within the camera's speed capabilities. The signal to noise ratio (S/N) is 0.7. To boost the S/N ratio to a higher value on overcast days, one needs to employ an illumination source 14. Illumination source 14 will also be helpful during nighttime. If one operated in the visible spectrum, the use of an illuminator in the high occupancy vehicle (HOV) lane would be prohibitive. Fortunately, in this case, the spectral signature of illuminator 14 for the 1.4 to 1.7 micron waveband can be safely employed in the HOV lane.

Post processing includes a neural network that performs automatic vehicle occupant detection. The vehicle occupant detection approach is based upon a fuzzy neural network algorithm. The perfect binary image provided by the fusion approach described above facilitates high correct detection rates.

What is claimed is:

1. A detection method comprising:
   detecting reflection from a scene using an imaging device operating in at least a portion of an upper band of the near infrared spectrum, the imaging device for use in providing an image frame representative of the detected reflection from at least one region of the scene and the detected reflection from at least another region of the scene, wherein the at least one region of the scene and the at least another region of the scene are spatially distinct; and
   determining the presence of a human body in the scene by comparing the detected reflection of the at least one region of the scene to the detected reflection of the at least another region of the scene represented in the image frame.

2. The method of claim 1, wherein the at least a portion of the upper band of the near infrared spectrum is at least a portion within the range of 1.4 $\mu$m and above in the near infrared spectrum.

3. The method of claim 1, wherein the at least a portion of the upper band of the near infrared spectrum comprises at the 1.4 $\mu$m to 2.2 $\mu$m band in the near infrared spectrum.

4. The method of claim 1, wherein detecting reflection includes detecting reflection from the at least one region of the scene comprising a face region of the human body.

5. The method of claim 1, wherein detecting reflection includes detecting reflection from the at least another region of the scene comprising one or more inanimate objects.

6. The method of claim 1, wherein determining the presence of a human body in the scene includes displaying to a user a representation of the detected reflection of the at least one region of the scene and the at least another region of the scene.

7. The method of claim 1, wherein determining the presence of a human body in the scene comprises:
   generating data representative of the detected reflection; and
   comparing the data to at least one threshold reference reflection level.

8. The method of claim 7, wherein generating data representative of the detected reflection comprises focusing the scene on a pixel array that is sensitive to the at least a portion of the upper band of the near infrared spectrum, and generating a signal representative of the spectral power for each of a plurality of pixels of the pixel array to be used for the comparison to the at least one threshold reference reflection level.

9. The method of claim 7, wherein the at least one threshold reference reflection level is based on a level of reflection of an inanimate object.

10. The method of claim 7, wherein the at least one threshold reference reflection level is based on a level of reflection of a human body.

11. The method of claim 1, wherein the method further comprises illuminating the scene using an illumination source matched to the at least a portion of an upper band of the near infrared spectrum.

12. A human body detection system comprising:
   a camera sensitive to at least a portion of an upper band of the near infrared spectrum to provide pixel value signals based on detected reflectance of a scene, the camera for use in providing an image frame representative of detected reflection from at least one region of the scene and detected reflection from at least another region of the scene, wherein the at least one region of the scene and the at least another region of the scene are spatially distinct; and
   circuitry operable to provide a comparison of the detected reflection of the at least one region of the scene to the detected reflection of the at least another region of the scene represented in the image frame for use in detecting the presence of a human body in the scene.

13. The system of claim 12, wherein the at least a portion of the upper band of the near infrared spectrum is at least a portion within the range of 1.4 $\mu$m and above in the near infrared spectrum.

14. The system of claim 13, wherein the at least a portion of the upper band of the near infrared spectrum comprises at least the 1.4 $\mu$m to 2.2 $\mu$m band in the near infrared spectrum.

15. The system of claim 12, wherein the at least one region of the scene comprises a face region of the human body.

16. The system of claim 12, wherein the at least another region of the scene comprises one or more inanimate objects.

17. The system of claim 12, wherein the system further comprises a display operable under control of the circuitry to provide a representation of the detected reflection of the at least one region of the scene and the at least another region of the scene for use in determining the presence of the human body in the scene.

18. The system of claim 12, wherein the circuitry is operable to generate data representative of the detected reflection from the pixel value signals and to compare the data to at least one threshold reference reflection level.

19. The system of claim 18, wherein the at least one threshold reference reflection level is based on a level of reflection of an inanimate object.

20. The system of claim 18, wherein the at least one threshold reference reflection level is based on a level of reflection of a human body.

21. The system of claim 12, wherein the system further comprises an illumination source matched to the at least a portion of an upper band of the near infrared spectrum for use in illuminating the scene.

22. A detection method comprising:
   detecting reflection from a scene using an imaging device operable in at least a portion of an upper wavelength band of the near infrared spectrum, the imaging device for use in providing an image frame representative of detected reflection from a first region of the scene and detected reflection from a second region of the scene, wherein the first region and the second region are spatially distinct;
   comparing the detected reflection of the first region of the scene to the detected reflection of the second region of the scene represented in the image frame; and
   determining the presence of a human body in the scene based on the comparison between the detected reflection of the first region of the scene to the detected reflection of the second region of the scene represented in the image frame.

23. The method of claim 22, wherein detecting reflection from at least a first region of the scene and the second region of the scene comprises:
   focusing light reflected from the first region of the scene on at least one pixel of a pixel array; and
   focusing light reflected from the second region of the scene on at least a different pixel of the pixel array.

24. The method of claim 23, wherein comparing the detected reflection of the first region of the scene to the detected reflection of the second region of the scene comprises comparing a spectral power of the at least one pixel of the pixel array to a spectral power of the at least a different pixel of the pixel array.

25. The method of claim 22, wherein the at least a portion of the upper wavelength band of the near infrared spectrum is at least a portion within the range of 1.4 $\mu$m and above in the near infrared spectrum.

26. The method of claim 25, wherein the at least a portion of the upper wavelength band of the near infrared spectrum comprises at least the 1.4 $\mu$m to 2.2 $\mu$m wavelength band in the near infrared spectrum.

27. The method of claim 22, wherein detecting reflection from at least the first region of the scene further comprises detecting reflection from at least the first region of the scene comprising a face region of the human body.

28. The method of claim 22, wherein detecting reflection from at least the second region of the scene further comprises detecting reflection from at least the second region of the scene comprising one or more inanimate objects.

29. The method of claim 22, wherein determining the presence of the human body in the scene comprises displaying to a user a representation of the detected reflection from the at least the first region of the scene and the second region of the scene.

30. The method of claim 22, wherein determining the presence of the human body in the scene comprises:
   generating data representative of the detected reflection from the at least the first region of the scene and the second region of the scene; and comparing the data to at least one threshold reference reflection level.

31. The method of claim 30, wherein the at least one threshold reference reflection level is based on a level of reflection of an inanimate object.

32. The method of claim 30, wherein the at least one threshold reference reflection level is based on a level of reflection of a human body.

33. The method of claim 22, wherein the method further comprises illuminating the scene using an illumination source matched to the at least a portion of the upper wavelength band of the near infrared spectrum.

34. A detection method comprising:

provriding an imaging device operable in at least a portion of an upper wavelength band within the range of 1.4 $\mu$m and above in the near infrared spectrum, wherein the imaging device comprises a pixel array for use in providing an image frame representative of detected reflection from a first region of a scene and detected reflection from a second region of the scene.

focusing light reflected in at least the portion of the upper wavelength band within the range of 1.4 $\mu$m and above in the near infrared spectrum from the first region of the scene on at least one pixel of the pixel array for use in providing the image frame; and focusing light reflected in at least the portion of the upper wavelength band within the range of 1.4 $\mu$m and above in the near infrared spectrum from the second region of the scene on at least a different pixel of the pixel array for use in providing the image frame, wherein the first region and the second region are spatially distinct;

comparing a spectral power of the at least one pixel of the pixel array to a spectral power of the at least the different pixel of the pixel array; and determining the presence of a human body in the scene based on the comparison.

35. The method of claim 34, wherein the at least a portion of the upper wavelength band of the near infrared spectrum comprises at least the 1.4 $\mu$m to 2.2 $\mu$m wavelength band in the near infrared spectrum.

36. The method of claim 35, wherein the second region of the scene comprises one or more inanimate objects.

37. The method of claim 36, wherein determining the presence of the human body in the scene comprises displaying to a user a representation of the spectral power.

38. The method of claim 36, wherein determining the presence of the human body in the scene comprises:

generating data representative of the spectral power; and comparing the data to at least one threshold reference reflection level.

39. The method of claim 38, wherein the at least one threshold reference reflection level is based on a level of reflection of an inanimate object.

40. The method of claim 38, wherein the at least one threshold reference reflection level is based on a level of reflection of a human body.

41. The method of claim 34, wherein the first region of the scene comprises a face region of the human body.

42. The method of claim 34, wherein the method further comprises illuminating the scene using an illumination source matched to the at least a portion of the upper wavelength band of the near infrared spectrum.

* * * * *